United States Patent
Talluri et al.

(10) Patent No.: US 11,947,535 B2
(45) Date of Patent: Apr. 2, 2024

(54) MULTICOMPUTER SYSTEM WITH MACHINE LEARNING ENGINE FOR QUERY OPTIMIZATION AND DYNAMIC DATA REORGANIZATION

(71) Applicant: Bank of America Corporation, Charlotte, NC (US)

(72) Inventors: Saritha Talluri, Telangana (IN); Venugopala Rao Randhi, Hyderabad (IN); Damodarrao Thakkalapelli, Agoura Hills, CA (US); Rama Venkata S. Kavali, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/307,173

(22) Filed: May 4, 2021

(65) Prior Publication Data
US 2022/0358127 A1 Nov. 10, 2022

(51) Int. Cl.
G06F 16/23 (2019.01)
G06F 16/2453 (2019.01)
G06F 16/2457 (2019.01)
G06N 20/00 (2019.01)

(52) U.S. Cl.
CPC ........ *G06F 16/24534* (2019.01); *G06F 16/23* (2019.01); *G06F 16/24578* (2019.01); *G06N 20/00* (2019.01)

(58) Field of Classification Search
CPC ......... G06F 16/24534; G06F 16/24578; G06F 16/2453; G06F 16/245
See application file for complete search history.

(56) References Cited

U.S. PATENT DOCUMENTS

| | | | |
|---|---|---|---|
| 8,356,026 B2 | 1/2013 | Heimendinger | |
| 10,585,872 B2 | 3/2020 | Boehme et al. | |
| 2005/0256884 A1 | 11/2005 | Arnold et al. | |
| 2008/0077557 A1* | 3/2008 | Schneider | G06F 16/24553 707/E17.14 |

(Continued)

OTHER PUBLICATIONS

"SQL Refactoring techniques—How to split a table in SQL", ApexSQL by Quest, Mar. 10, 2014.

(Continued)

*Primary Examiner* — Robert W Beausoliel, Jr.
*Assistant Examiner* — Pedro J Santos
(74) *Attorney, Agent, or Firm* — Banner & Witcoff, Ltd.

(57) ABSTRACT

Systems for dynamic data reorganization and query optimization are provided. In some aspects, a database query may be received and evaluated to determine whether it meets one or more criteria. If the database query meets the one or more criteria, the query may be executed and the output of the executed database may be transmitted to the user device. If the database query does not meet the one or more criteria, data associated with the database query may be dynamically modified and/or reorganized (e.g., using machine learning). Modified data may be generated based on the dynamically modified and/or reorganized data. The modified data may be stored in an optimized query cache. An updated query may be generated based on the modified data and stored in the optimized query cache. The updated query may be executed and an output of the executed updated query may be transmitted to the user device.

19 Claims, 9 Drawing Sheets

(56) References Cited

U.S. PATENT DOCUMENTS

| | | | |
|---|---|---|---|
| 2011/0029508 A1* | 2/2011 | Al-Omari | G06F 16/24542 707/718 |
| 2011/0055202 A1* | 3/2011 | Heimendinger | G06F 16/245 706/14 |
| 2013/0275685 A1 | 10/2013 | Barbas et al. | |
| 2016/0078086 A1* | 3/2016 | Nowak-Przygodzki | G06F 16/24578 707/723 |
| 2016/0147833 A1* | 5/2016 | Chaudhry | G06F 16/24552 707/717 |
| 2016/0179807 A1* | 6/2016 | Kumar | G06F 16/9535 707/706 |
| 2017/0039232 A1 | 2/2017 | Jayanth et al. | |
| 2017/0147639 A1* | 5/2017 | Lee | G06F 16/24539 |
| 2017/0371925 A1* | 12/2017 | Arya | G06F 16/24534 |
| 2018/0018366 A1* | 1/2018 | Forman | G06F 16/24534 |
| 2018/0024924 A1 | 1/2018 | Winkler | |
| 2020/0192903 A1 | 6/2020 | Bansal et al. | |

OTHER PUBLICATIONS

Tang et al., "Usage Pattern-Driven Dynamic Data Layout Reorginization", 2016 16th IEEE/ACM International Symposium on Cluster, Cloud and Grid Computing, 2016, pp. 356-365.

Patvarczki, "Layout Optimization for Distributed Relational Databases Using Machine Learning", A Dissertation Submitted to the Faculty of the Worcester Polytechnic Institute in Partial Fulfillment of the Requirements for the Degree of Doctor of Philosophy in Computer Science, May 2012, 181 pages.

Wu et al., "Intelligent data cache based on content popularity and user location for Content Centric Networks", Human-centric Computing and Information Sciences, 2019, 16 pages.

Ganapathi et al., "Predicting Multiple Metrics for Queries: Better Decisions Enabled by Machine Learning", 12 pages, 2009.

* cited by examiner

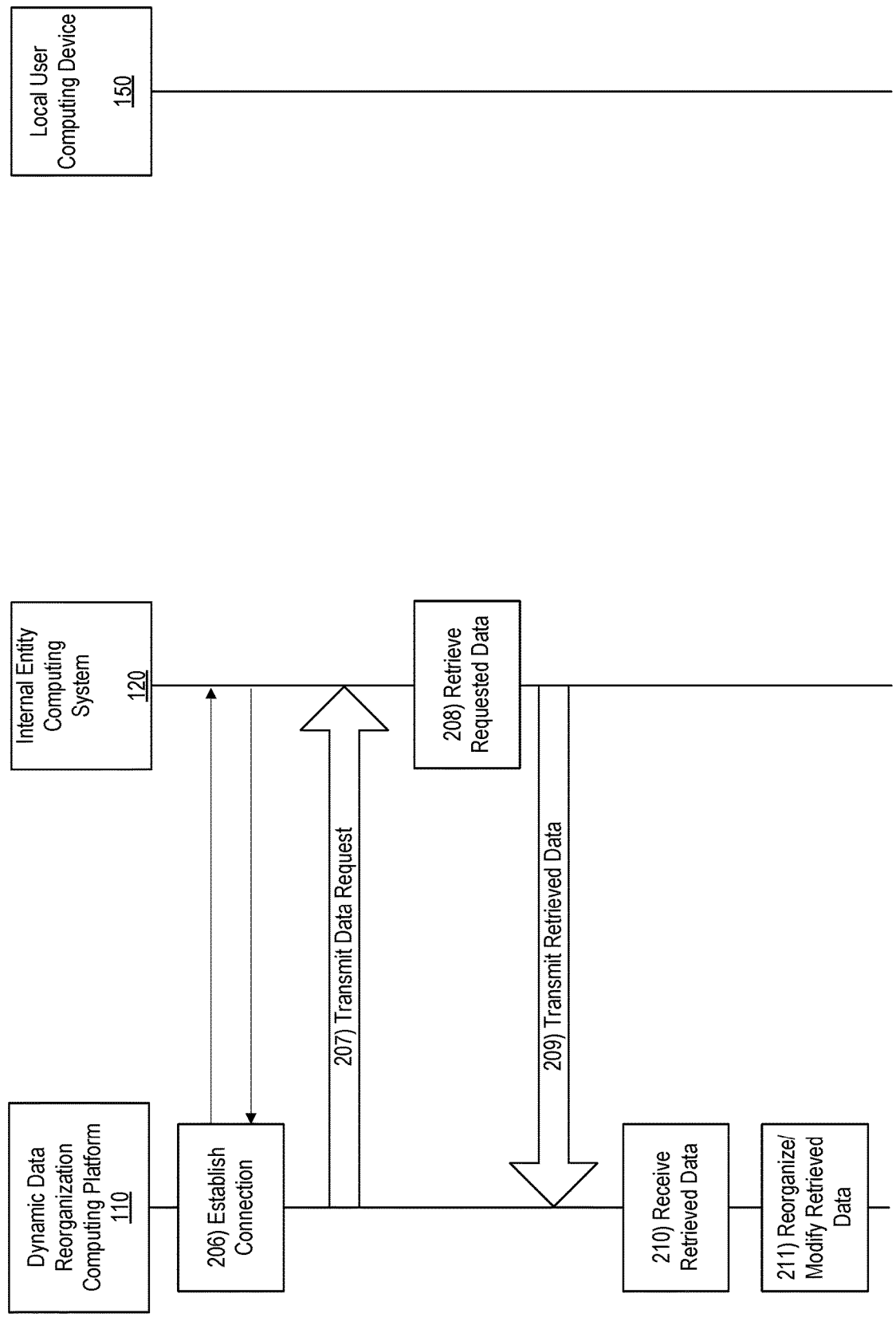

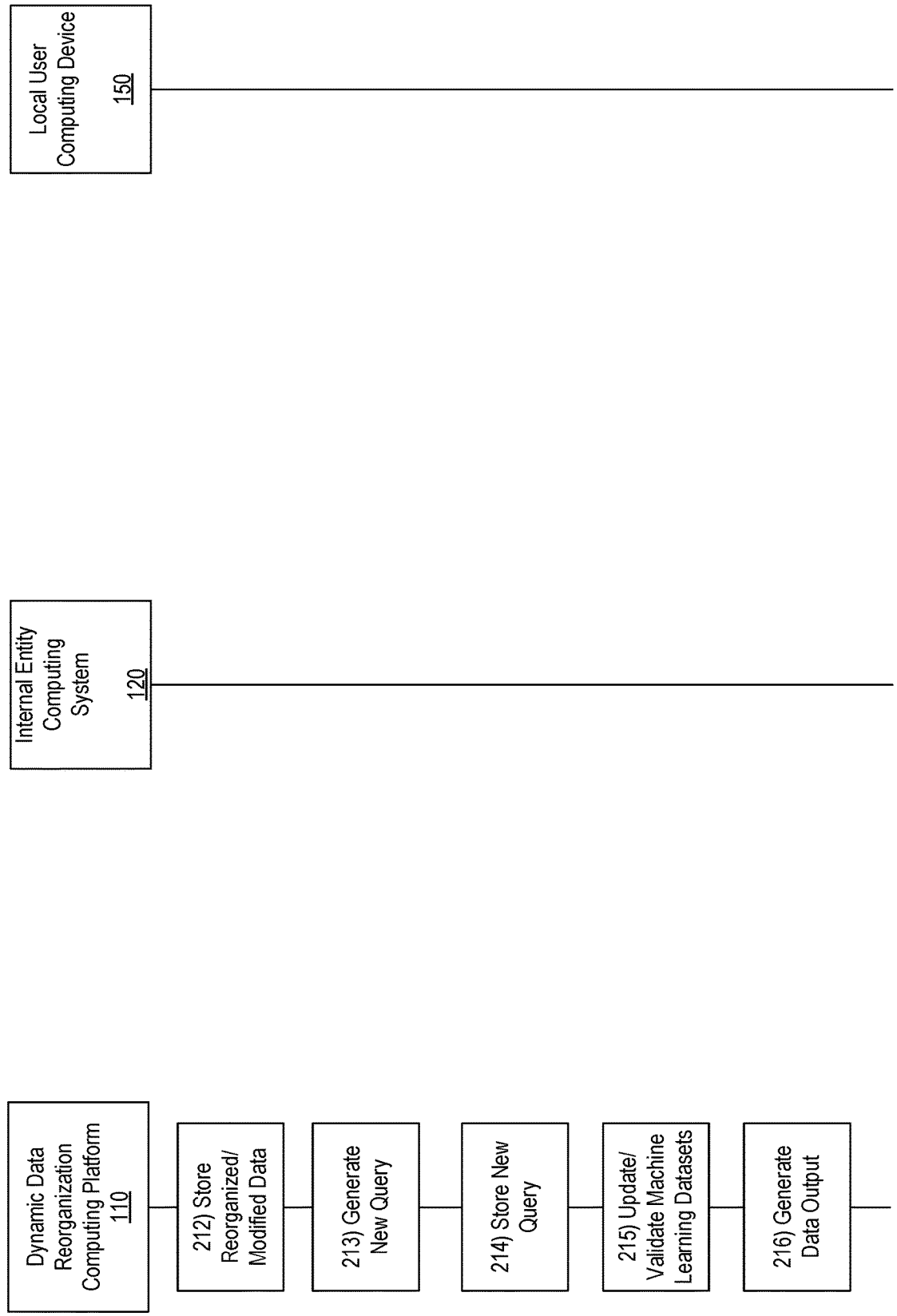

MULTICOMPUTER SYSTEM WITH MACHINE LEARNING ENGINE FOR QUERY OPTIMIZATION AND DYNAMIC DATA REORGANIZATION

BACKGROUND

Aspects of the disclosure relate to electrical computers, systems, and devices performing dynamic data reorganization and query optimization.

Structured query language (SQL) is commonly used to communicate with databases, such as relational database management systems (RDBMS). However, SQL queries are often static, and result in inefficient searches and data retrieval, as well as excess data being provided to a user. Accordingly, query optimization and dynamic data reorganization may be used to modify data and generate an optimized query to ensure data is efficiently retrieved and provided to the requesting user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated efficiently executing queries.

In some aspects, a database query may be received. The database query may be evaluated to determine whether it meets one or more criteria. For instance, the database query may be evaluated to determine whether it is considered optimized by comparing it to pre-stored optimized queries in an optimized query cache. If the database query meets the one or more criteria, the query may be executed and the output of the executed database may be transmitted to the user device.

If the database query does not meet the one or more criteria, the data associated with the database query may be dynamically modified and/or reorganized. For instance, one or more data reorganization processes (e.g., normalization, de-normalization, purging, or the like) may be performed. Modified data may be generated based on the dynamically modified and/or reorganized data. In some examples, machine learning may be used to modify or reorganize the data. The modified or reorganized data may be stored (e.g., as physical data tables) in an optimized query cache.

An updated query may be generated based on the modified and/or reorganized data.

The updated query may be validated and stored in the optimized query cache. The updated query may be executed and an output of the executed updated query may be transmitted to the user device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for implementing dynamic data reorganization and query optimization functions in accordance with one or more aspects described herein;

DETAILED DESCRIPTION

Figure 1A:
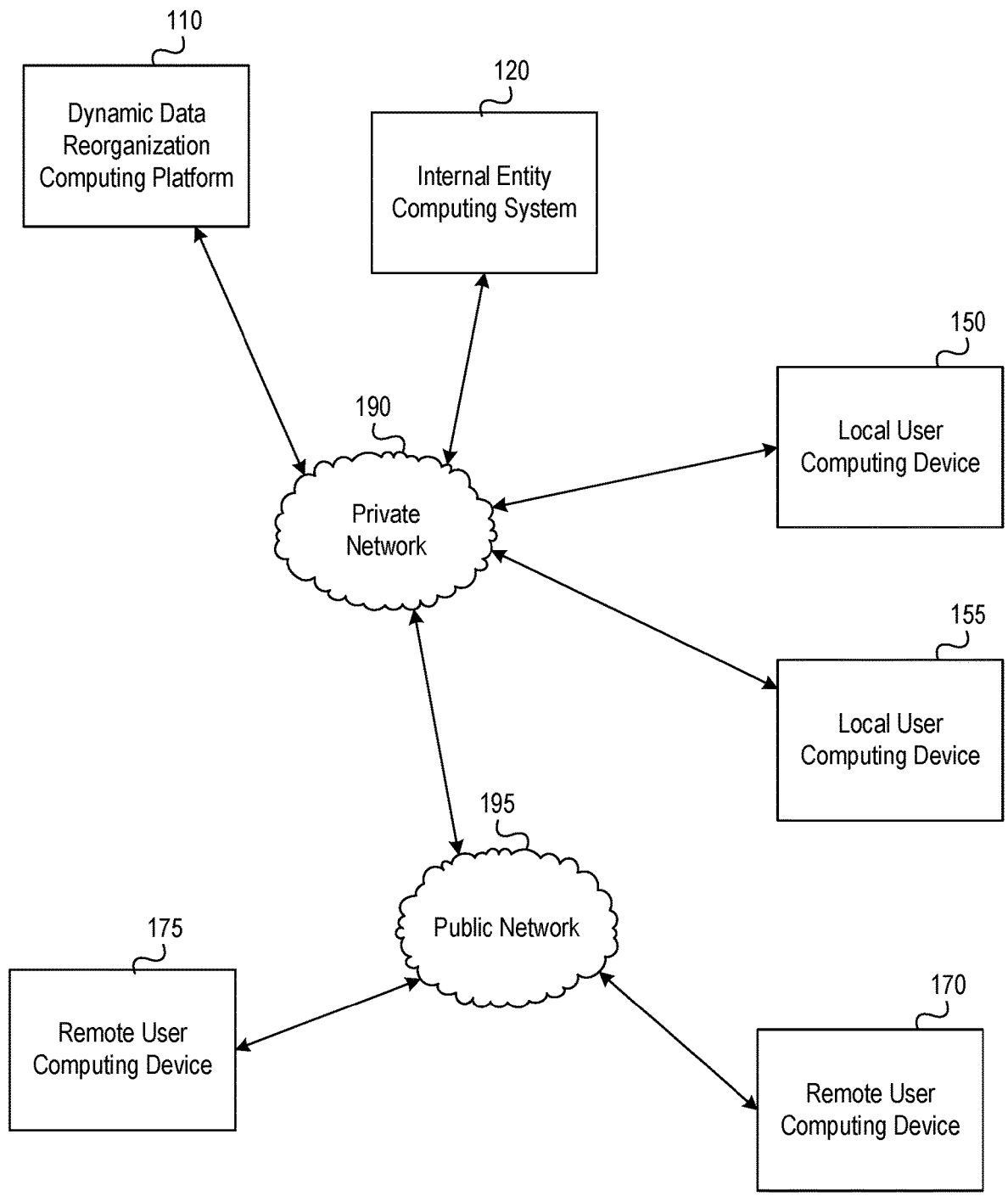
FIGS. 1A and 1B depict an illustrative computing environment for implementing dynamic data reorganization and query optimization functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, structured query language (SQL) is commonly used to communicate with databases, such as relational database management systems (RDBMS). However, SQL queries can result in inefficient searches and data retrieval, as well as excess data being provided to a user. Accordingly, arrangements described here are related to query optimization and dynamic data reorganization that may be used to modify data and generate an optimized query to ensure data is efficiently retrieved and provided to the requesting user.

For instance, in some aspects, a framework may be used to dynamically organize data (e.g., data within a database). In some examples, dynamically organizing the data may include performing processes including automatic normalization, de-normalization, purge, partition, or the like. In some examples, the framework may move data into separate files or merge data dynamically. Machine learning may be used to perform the dynamic organization processes (e.g., identify portions of a table to split/output to the user, or the like). Additionally or alternatively, machine learning may be used to optimize a query to ensure that the user receives the desired data in the most efficient manner.

In some examples, the framework may propose multiple alternatives which may be ranked based on performance and/or factors such as time of day, load on a server, and/or input/output. In some arrangements, a highest ranked solution may be selected.

In some arrangements, metadata driven optimized query cache architecture may retain persistent copies of the data on a lower latency device based on device usage readily available to accelerate fetching of data and optimization of the query. In some examples, the cache may be released based on configuration settings (e.g., metadata).

Accordingly, the arrangements described enable generation of an optimized or re-written query based on dynamic data reorganization (e.g., vertical/horizontal data movement, partition, compress, data deletion, data split/merge vertically/horizontally based on time of usage, and the like).

Aspects described herein may be implemented and/or executed via a dynamic query optimization computing platform. The dynamic query optimization computing platform may communicate (e.g., via one or more public or private networks) with one or more user computing devices, other entity systems or devices, and the like. In some examples, the dynamic query optimization computing platform may include one or more modules configured to perform various functions described herein (e.g., data reorganization, optimized query generation, optimized query and table storage, and the like).

These and various other arrangements will be discussed more fully below.

Figure 1B:
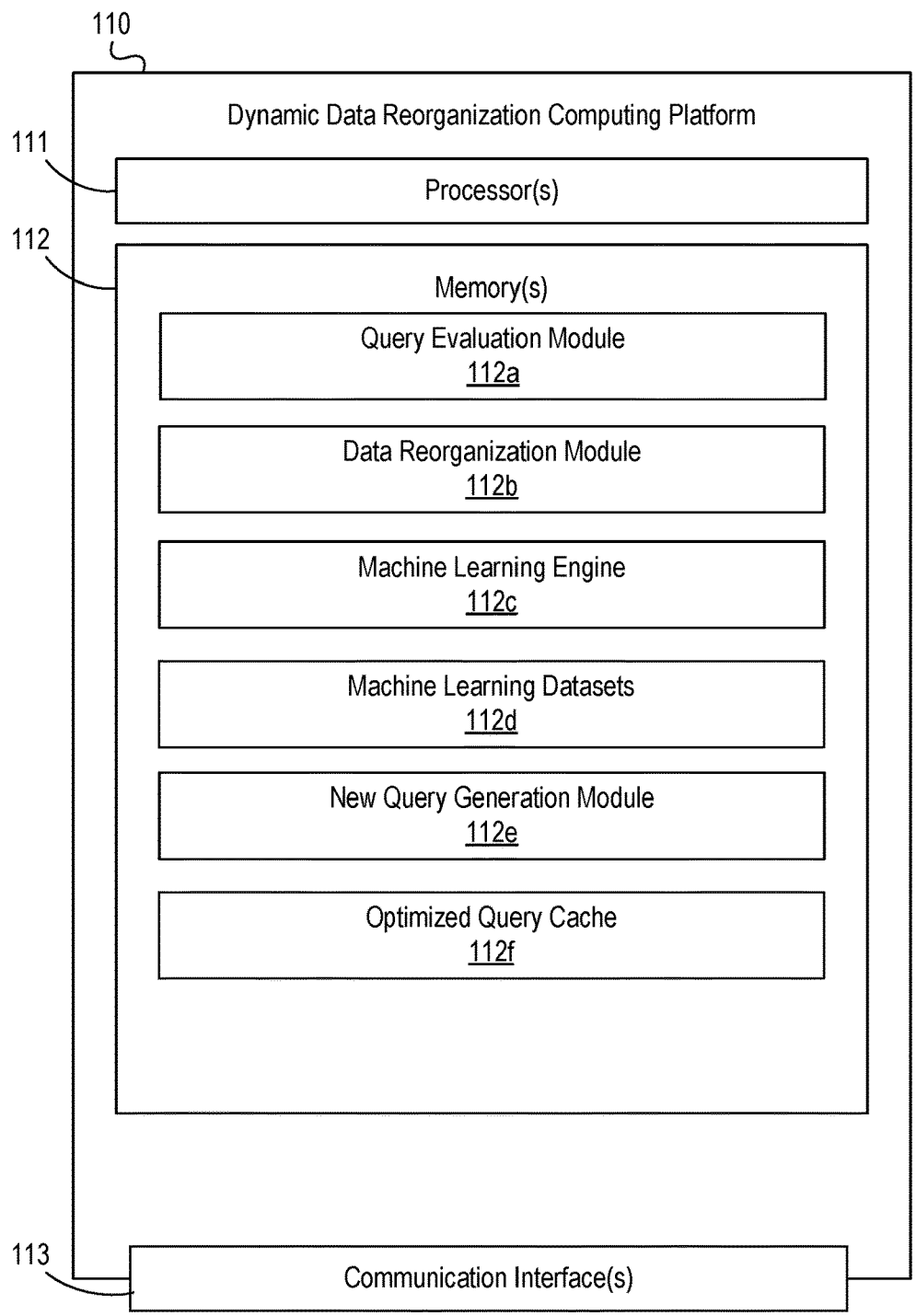

FIGS. 1A-1B depict an illustrative computing environment for implementing and using dynamic database modification and optimized query generation functions in accordance with one or more aspects described herein. Referring to FIG. 1A, computing environment 100 may include one or more computing devices and/or other computing systems. For example, computing environment 100 may include dynamic data reorganization computing platform 110, internal entity computing system 120, a first local user computing device 150, a second local user computing device 155, a first remote user computing device 170, and a second remote user computing device 175. Although one internal entity computing system 120 is shown, additional devices or systems may be used without departing from the invention.

Dynamic data reorganization computing platform 110 may be configured to provide intelligent, dynamic data reorganization and query optimization functions. For instance, dynamic data reorganization computing platform 110 may receive a query from a user device, such as local user computing device 150, 155, remote user computing device 170, 175 or the like. Dynamic data reorganization computing platform 110 may analyze the received query to determine whether it is optimized. For instance, the query may be evaluated to determine whether it meets one or more criteria, such as being stored in an optimized query cache. If so, dynamic data reorganization computing platform may execute the query to retrieve data (e.g., from one or more internal entity computing system, such as internal entity computing system 120) and transmit the output to the user device.

If the query does not meet the one or more criteria, the query may be optimized. For instance, data associated with the query may be retrieved and processed to dynamically reorganize the data in order to minimize the required unique list of columns to fulfill the request. Accordingly, the amount of data to be processed may be minimized, thereby resulting in faster performance.

In some examples, machine learning may be used to dynamically reorganize the data. For instance, factors such as time of day, query execution time, table/column usage, business interest, and the like, may be used with one or more machine learning algorithms to dynamically reorganize the data, generate one or more new queries, select an optimized query, and the like.

In some examples, dynamically reorganizing data may include normalization, de-normalization, purge, partition, data sliding, splitting or merging data using indexes, partitions, marts, and the like.

Once the data is dynamically reorganized, one or more new queries may be generated associated with the reorganized data. In some examples, the query may be rewritten based on server internal resources, such as CPU, hit ratio, RAM, and the like. Additionally or alternatively, a new query may be generated based on the RDBMS version (e.g., using backward compatibility, new version features, different RDBMS version, or the like). In some examples, a plurality of queries may be generated and, based on machine learning, an optimized query may be identified from the plurality of queries. For instance, machine learning may be used to rank (e.g., based on data usage, point in time, or the like) the plurality of queries to identify a best query for future use.

The dynamically reorganized data and/or identified new or optimized query may be stored in an optimized query cache. Accordingly, the optimized query cache may be metadata driven and retrain persistent copies of the data on a lower latency device based on usage readily available to accelerate fetching of data. In some examples, the cache may be released based on one or more metadata settings.

After optimizing the query and dynamically reorganizing data, in some examples, the identified query may be validated against the original user query by executing on generated or mimic data to ensure performance is improved over the original query.

The query may then be executed and data output to the requesting user.

Internal entity computing system 120 may be one or more computing devices, systems or the like associated with the entity or enterprise organization implementing the dynamic data reorganization computing platform 110. For instance, internal entity computing system 120 may be a system internal to the enterprise organization implementing the dynamic data reorganization computing platform1 110. The internal entity computing system 120 may be configured to store data that may be retrieved based on one or more user queries, data to be dynamically reorganized based on user queries, or the like.

Local user computing device 150, local user computing device 155, and the like, may be computing devices associated with or used by one or more employees of the enterprise organization to perform various job functions, input and transmit queries, and the like. The computing devices 150, 155 may include various types of user computing devices and may display one or more user interfaces, display query output results, and the like.

Remote user computing device 170 and/or remote user computing device 175 may computing devices operated by one or more employees of the enterprise organization to request data via one or more queries. For instance, remote user computing device 170 and/or remote user computing device 175 may be a user computing device owned by or associated with the employee and connected to the enterprise organization via a public network.

Computing environment 100 also may include one or more computing platforms. For example, and as noted above, computing environment 100 may include dynamic data reorganization computing platform 110. As illustrated in greater detail below, dynamic data reorganization computing platform 110 may include one or more computing devices configured to perform one or more of the functions described herein. For example, dynamic data reorganization computing platform 110 may include one or more computers (e.g., laptop computers, desktop computers, servers, server blades, or the like).

As mentioned above, computing environment 100 also may include one or more networks, which may interconnect one or more of dynamic data reorganization computing platform 110, internal entity computing system 120, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic data reorganization computing platform 110, internal entity computing system 120, local user computing device 150, and local user computing device 155, may be associated with an enterprise organization (e.g., a financial institution), and private network 190 may be associated with and/or operated by the organization, and may include one or more networks (e.g., LANs, WANs, virtual private networks (VPNs), or the like) that interconnect dynamic data reorganization computing platform 110, internal entity computing system 120, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., dynamic data reorganization computing platform 110, internal entity computing system 120, local user computing device 150, local user computing device 155) with one or more networks and/or computing devices that are not associated with the organization. For example, remote user computing device 170 and/or remote user computing device 175, might not be associated with an organization that operates private network 190 (e.g., because remote user computing device 170 and/or remote user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote user computing device 170 and/or remote user computing device 175 to private network 190 and/or one or more computing devices connected thereto (e.g., dynamic data reorganization computing platform 110, internal entity computing system 120, local user computing device 150, local user computing device 155).

Referring to FIG. 1B, dynamic data reorganization computing platform 110 may include one or more processors 111, memory 112, and communication interface 113. A data bus may interconnect processor(s) 111, memory 112, and communication interface 113. Communication interface 113 may be a network interface configured to support communication between dynamic data reorganization computing platform 110 and one or more networks (e.g., private network 190, public network 195, or the like). Memory 112 may include one or more program modules having instructions that when executed by processor(s) 111 cause dynamic data reorganization computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic data reorganization computing platform 110 and/or by different computing devices that may form and/or otherwise make up dynamic data reorganization computing platform 110.

For example, memory 112 may have, store and/or include query evaluation module 112a. Query evaluation module 112a may store instructions and/or data that may cause or enable the dynamic data reorganization computing platform 110 to evaluate a query received from a user device, such as local user computing device 150, 155, remote user computing device 170, 175, or the like. The query may be evaluated to determine whether it is optimized. For instance, the query may be evaluated to determine whether it meets one or more criteria, such as matching a query stored in an optimized query cache. If so, the dynamic data reorganization computing platform 110 may execute the query and provide the output to the requesting user device. If not, additional analysis, data reorganization, and the like may be performed.

Dynamic data reorganization computing platform 110 may further have, store and/or include data reorganization module 112b. Data reorganization module 112b may store instructions and/or data that may cause or enable the dynamic data reorganization computing platform 110 to retrieve data associated with a query (e.g., not meeting optimized criteria) and dynamically modify the data to identify data likely to be used by the user, eliminate unnecessary data, and the like. For instance, data may be dynamically organized or reorganized using processes such as normalization, de-normalization, purging, partitioning, and the like, based on table/column usage, time of day, user, application, group, business purpose, or the like. The identified data may be moved out into separate files or merged dynamically. In some example, the data may be reorganized as requested and discarded once no longer needed, upon expiration of a predetermined time, or the like.

The reorganized data may be stored in dynamically created cache tables which are physical data tables that are best normalized/partitioned based on, for instance, business interest using, for example, machine learning.

As discussed herein, in some examples, machine learning may be used to dynamically organize or reorganize data. Accordingly, dynamic data reorganization computing platform 110 may further have, store and/or include a machine learning engine 112c and machine learning datasets 112d. Machine learning engine 112c and machine learning datasets 112d may store instructions and/or data that may cause or enable dynamic data reorganization computing platform 110 to analyze queries and retrieved data, user data, time of day data, business use data, and the like, to predict a query and associated data that would meet optimization criteria (e.g., provides required data without extraneous data, provides fast processes, and the like). For instance, machine learning datasets 112d may be generated by analyzing previous or current queries received, data output, value of data output, time for processing, and the like. Accordingly, a machine learning model may be trained based on historical data related to various queries, business uses, resource availability, and the like. This training data may be used to generated one or more machine learning datasets 112d linking particular characteristics of a query, user, or the like, to particular data within a data table. The machine learning datasets 112d, based on the trained model, may be used to identify patterns or sequences in data and identify data from the data table for splitting, merging, or the like.

Machine learning datasets 112d may be generated based on analyzed data (e.g., data from previously received data, and the like), raw data, and/or received from one or more outside sources.

Various machine learning algorithms may be used (e.g., by the machine learning engine 112c) without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112c may analyze data to identify patterns of activity, sequences of activity, and the like, to generate one or more machine learning datasets 112d.

Dynamic data reorganization computing platform 110 may further have, store, and/or include new query generation module 112e. New query generation module 112e may store instructions and/or data that may cause or enable the dynamic data reorganization computing platform 110 to rewrite a received query and/or generate a new query based on the reorganized data. For instance, a query may be rewritten based on server resources. Additionally or alternatively, a new query may be generated based on an automatically identified RDBMS version (e.g., using backward compatibility, new version features, different RDBMS version, or the like). In some examples, multiple queries may be generated and may be ranked (e.g., using machine learning) to identify a "best" query. This query, as well as any data tables containing reorganized data, may then be saved for future use.

For instance, dynamic data reorganization computing platform 110 may further have, store and/or include optimized query cache 112f. Optimized query cache 112f may store queries identified as optimized (e.g., generated or rewritten queries, queries ranked as "best" or "optimized" or the like). Further, optimized query cache may store one more data tables generated and include dynamically reorganized data. The optimized query cache may be metadata driven and the cache may be released based on one or more metadata settings.

FIGS. 2A-2D depict one example illustrative event sequence for implementing and using dynamic database reorganization and optimized query generation functions in accordance with one or more aspects described herein. The events shown in the illustrative event sequence are merely one example sequence and additional events may be added, or events may be omitted, without departing from the invention. Further, one or more processes discussed with respect to FIGS. 2A-2D may be performed in real-time or near real-time.

Figure 2A:
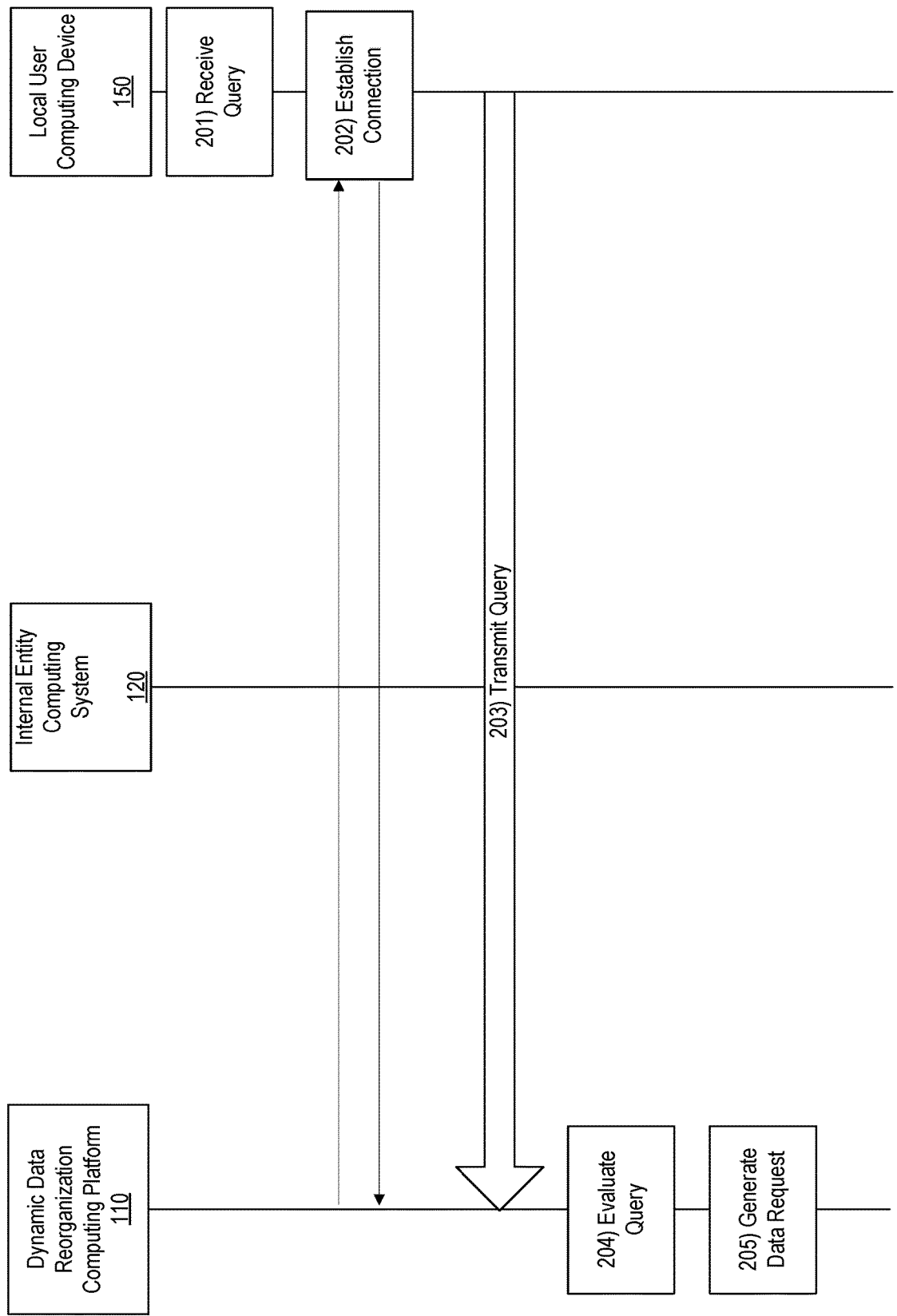

Referring to FIG. 2A, at step 201, the local user computing device 150 may receive a query. For instance, a user may input a query to the local user computing device 150. Although the arrangement shown includes a query received by local user computing device 150, a user may input a query to local user computing device 155, remote user computing device 170, remote user computing device 175, or the like, without departing from the invention. The query may include information related to a user submitting the query, user device to which the query was input, and the like.

At step 202, a connection may be established between the local user computing device 150 and the dynamic data reorganization computing platform 110. For instance, a first wireless connection may be established between the local user computing device 150 and dynamic data reorganization computing platform 110. Upon establishing the first wireless connection, a communication session may be initiated between dynamic data reorganization computing platform 110 and local user computing device 150.

At step 203, the query received by local user computing device 150 may be transmitted to the dynamic data reorganization computing platform 110. For instance, the query may be transmitted during the communication session initiated upon establishing the first wireless connection.

At step 204, the query may be received by the dynamic data reorganization computing platform 110 and evaluated to determine whether it meets one or more criteria. For instance, the query may be evaluated to determine whether it is optimized by comparing the query to pre-stored queries in, for instance, an optimized query cache. If the query matches a query in the optimized query cache, the query may be considered optimized and the query may be executed to retrieve the requested data and output the data to the user.

If the query does not meet one or more criteria, at step 205, a data request may be generated. For instance, a request for data associated with the query may be generated.

With reference to FIG. 2B, at step 206, a connection may be established between the dynamic data reorganization computing platform 110 and internal entity computing system 120. For instance, a second wireless connection may be established between the dynamic data reorganization computing platform 110 and the internal entity computing system 120. Upon establishing the second wireless connection, a communication session may be initiated between dynamic data reorganization computing platform 110 and internal entity computing system 120.

At step 207, the generated data request may be transmitted by the dynamic data reorganization computing platform 110 to the internal entity computing system 120. In some examples, the generated data request may be transmitted during the communication session initiated upon establishing the second wireless connection.

At step 208, the data request may be received and the requested data may be retrieved.

At step 209, the retrieved data may be transmitted by the internal entity computing system 120 to the dynamic data reorganization computing platform 110.

At step 210, the retrieved data may be received by the dynamic data reorganization computing platform 110.

At step 211, the data may be reorganized and/or modified by the dynamic data reorganization computing platform 110. In some examples, the data may be reorganized or modified in real-time or near real-time. In some arrangements, machine learning may be used to evaluate and modify and/or reorganize the data to efficiently provide a data output to the requesting user. In some examples, the received data (e.g., data table) may be split into one or more tables based on, for instance, frequency of use/request, user column usage, execution time, or the like.

In some examples, data associated with the user, user device, or the like, (e.g., received with the query) may be used (e.g., with machine learning) to reorganize or modify the data. For instance, job functions, business priorities and the like, associated with a user may be identified (e.g., from one or more databases storing user data, device data, or the like). This information may be used to accurately identify data of interest to the user when splitting tables, or performing other database processing functions.

Various data processes or database processing functions may be performed on the data to reorganize and/or modify the data based on the analysis. For instance, normalization, de-normalization, purging, partitioning, sliding, and the like, may be performed. In some examples, the data may be reorganized for the same set of data in different sub sets on an as-requested basis. For instance, as a query is received and the optimization process is performed, the data may be reorganized into subsets that provide, based on machine learning, the data desired by the user but eliminate unnecessary data. Accordingly, the same data may be split into different sub sets based on user, initial query, or the like. Physical data tables of the sub sets may be generated and stored in the optimized query cache at step 212 in FIG. 2C.

At step 213, a new query may be generated and/or the query rewritten. In some arrangements, the new query may be generated or query rewritten in real-time or near real-time. In some examples, the query may be rewritten based on resources available. Additionally or alternatively, new queries may be generated based on the reorganized/modified data. In some examples, response time for a query may be predicted using one or more machine learning models.

In some examples, model selection may be used, for instance, for parameter tuning to improve accuracy of the regression method. In some arrangements, each model may be evaluated using, for instance, K-fold cross verification. In some examples, one or more supervised learning algorithms may then be used for regression. For instance, in some arrangements, supervised learning algorithms such as support vector, random forest and/or gradient boosting may be used.

Feature selection may then use the model with the tuned parameter received from the model selection. In some examples, a statistical filter may be applied to the dataset and the model with the lowest error may be selected. The associated query may then be named for the user and/or query and stored in the optimized query cache at step 214.

At step 215, the optimized query may be validated against the original query to ensure it provides improved performance and, based on the output, one or more machine learning datasets may be updated and/or validated.

At step 216, a data output may be generated. For instance, the optimized query may be executed to retrieve the data identified for output to the user (e.g., the reorganized and/or modified data).

Figure 2D:
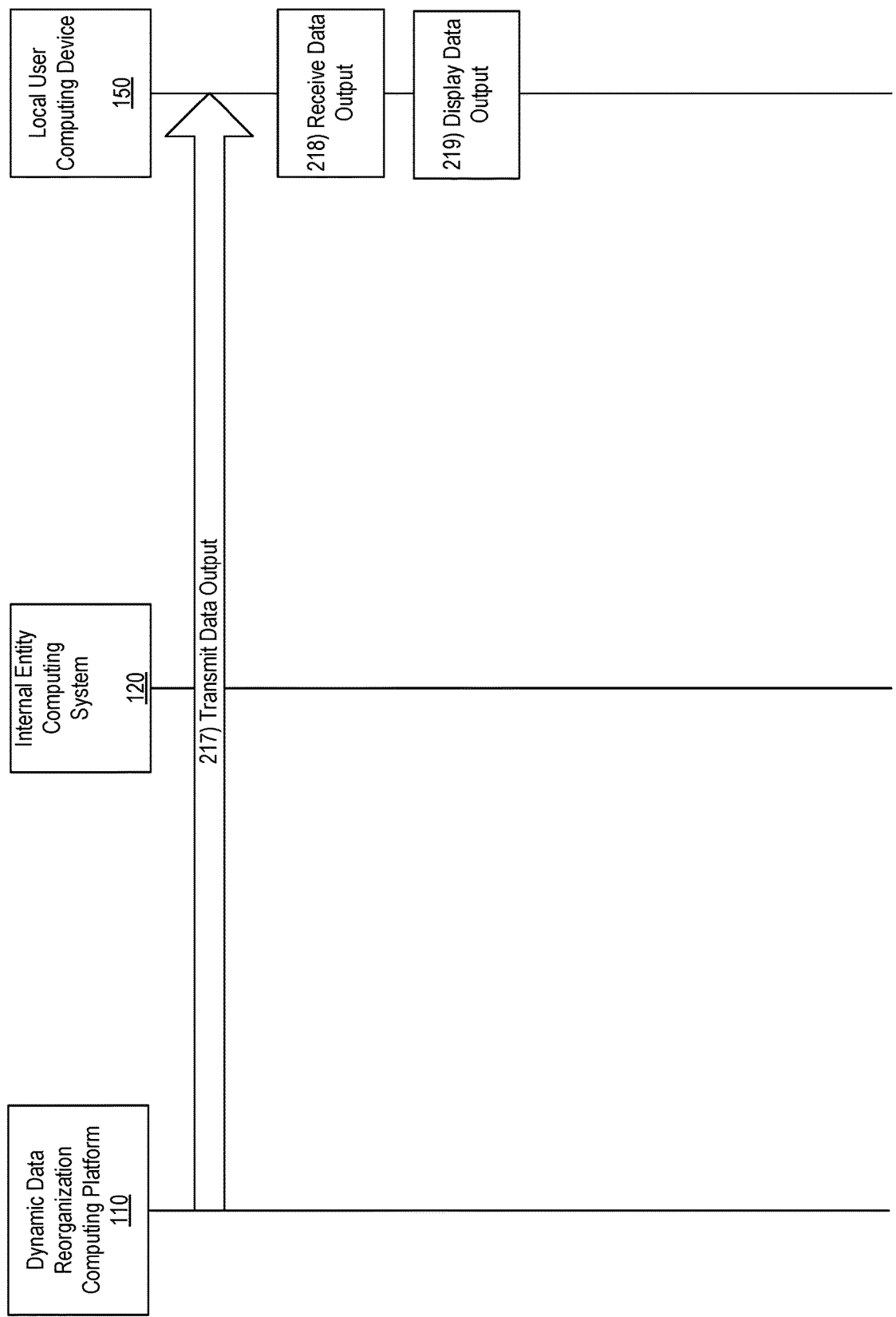

With reference to FIG. 2D, at step 217, the data output may be transmitted to the computing device from which the query was received, e.g., local user computing device 150. At step 218, the data output may be received by local user computing device 150 and, at step 219, displayed via a display of local user computing device 150.

Figure 3:
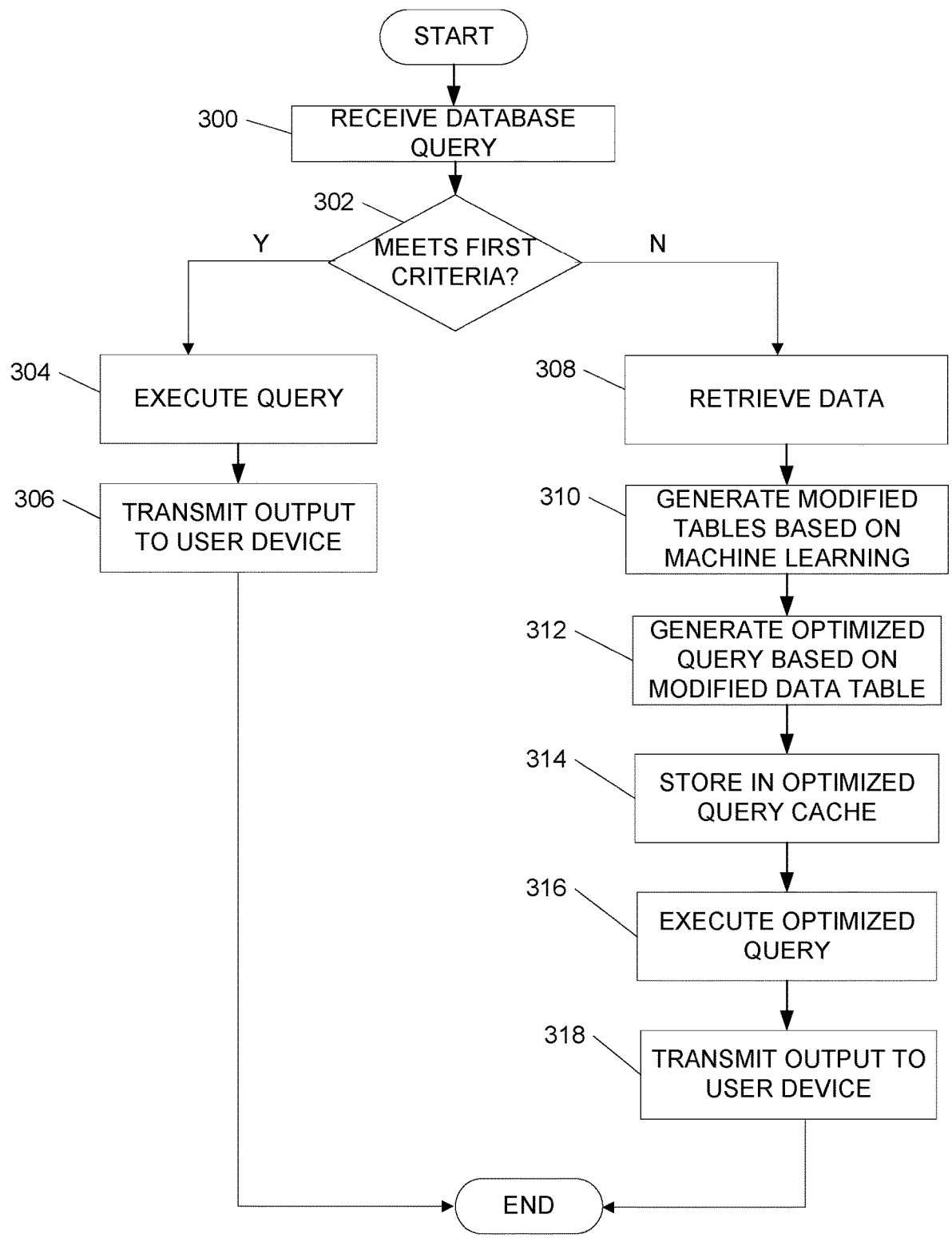
FIG. 3 depicts an illustrative method for implementing dynamic data reorganization and query optimization function according to one or more aspects described herein.

FIG. 3 is a flow chart illustrating one example method of implementing dynamic database modification and optimized query generation functions according to one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One or more steps shown in FIG. 3 may be performed in real-time or near real-time.

At step 300, a query may be received. For instance, an SQL query requesting to retrieve data from an RDBMS database may be received. The query may include information associated with the requested data (e.g., type of data, date range, or the like), as well as other information, such as user requesting the data, time of day of request, and the like.

At step 302, the query may be evaluated to determine whether it meets first criteria. For instance, the query may be evaluated to determine whether it has been optimized. In some examples, an optimized query may be one that was previously stored in an optimized query cache. Accordingly, the received query may be compared to one or more queries in the optimized query cache to determine whether the query meets first criteria.

If, at step 302, the query meets the first criteria, the query may be executed at step 304. Executing the query may cause retrieval of the requested data. In some examples, the data retrieved may be retrieved from the optimized query cache and may include modified data tables previously modified based on, for instance, machine learning.

At step 306, the retrieved data may be output to the user.

If, at step 302, the query does not meet first criteria, data associated with the query may be retrieved and or identified at step 308. For instance, data that would be provided by executing the non-optimized query may be retrieved for processing prior to providing an output to the user.

At step 310, based on the extracted data, machine learning may be used to generate one or more modified tables. For instance, based on the data requested, user requesting the data, time of day, or the like, one or more dynamically organized data tables may be generated. In some examples, dynamically organizing the data tables may include splitting, merging, normalizing, de-normalizing, or the like. Accordingly, the modified tables may include less than all of the data that was processed and/or would have been provided to the user by executing the non-optimized query. This may improve processing time associated with, for instance, future requests. In some examples, the modified tables may include fewer than all columns (e.g., only columns identified (e.g., using machine learning) that are needed by the user), fewer than all rows (e.g., only rows identified (e.g., using machine learning) that are needed by the user), or the like.

At step 312, a modified or updated query may be generated. For instance, based on the one or more modified tables, a modified query may be generated that is considered "optimized" because it is associated with the modified tables. In some examples, the query may be re-written based on resources available. Additionally or alternatively, a new query may be generated using, for instance, backward compatibility.

At step 314, the optimized query and/or the modified tables may be stored in the optimized query cache. In some examples, the modified tables may be released based on metadata stored in the table. Accordingly, by storing additional physical tables, the optimized query may provide faster processing.

At step 316, the modified query may be executed. For instance, the modified query may be executed on generated data and/or mimic data to ensure performance is better than the original query.

At step 318, the retrieved data (e.g., modified data tables) and/or updated or modified query may be transmitted to the requesting user.

As discussed herein, a framework described herein may be used to dynamically organize data (e.g., data within a database). In some examples, dynamically organizing the data may include performing processes including automatic normalization, de-normalization, purge, partition, or the like. In some examples, the framework may move data into separate files or merge data dynamically. In some examples, dynamically modifying and/or reorganizing data may be performed in real-time or near-real time as a query is received.

Machine learning may be used to perform the dynamic organization processes (e.g., identify portions of a table to split/output to the user, or the like). Additionally or alternatively, machine learning may be used to optimize a query to ensure that the user receives the desired data in the most efficient manner.

For instance, machine learning may be used to identify columns, data portions, rows, or the like, to provide in response to the user query. In some examples, machine learning datasets may be generated and/or machine learning models may be trained based on historical data, user validation data, or the like. Machine learning datasets may be generated based on analyzed data (e.g., data from previously received data, and the like), raw data, and/or received from one or more outside sources.

In some examples, based on query execution time, table/column usage and/or time of day, data tables may be reorganized (e.g., normalized into one or more tables) and stored in a cache, such as an optimized query cache. In some examples, the framework may determine a minimum required unique list of columns to fulfill the query request. This may minimize the amount of data to be processed through the entire query execution pipeline and may result in faster performance.

In some arrangements, metadata driven optimized query cache architecture may retain persistent copies of the data on a lower latency device based on device usage readily available to accelerate fetching of data and optimization of the query. In some examples, the cache may be released based on configuration settings (e.g., metadata).

Accordingly, the arrangements described enable generation of an optimized or re-written query based on dynamic data reorganization (e.g., vertical/horizontal data movement, partition, compress, data deletion, data split/merge vertically/horizontally based on time of usage, and the like). The dynamic data reorganization may be based on table, column and/or point in time usage and machine learning algorithms. In some examples, an engine may re-write the query based on the server internal resources (e.g., CPU, hit ratio, RAM, I/O, and/or H/SDD). In some examples, the engine may generate a new query based on the relational database management system (e.g., using backward compatibility/new version features/different RDBMS version, or the like).

In some examples, the framework engine may also generate more than one query for each user requirement. The framework may identify technical columns which might not be useful to the end users, eliminates (either by hiding or abstract them) technical columns while building new query. In some arrangements, the framework may propose multiple alternatives which may be ranked based on performance and/or factors such as time of day, load on a server, and/or input/output. In some arrangements, a highest ranked solution may be selected.

In some arrangements, the framework engine's optimized query may be validated against the original user query by executing on the generated/mimic data to make sure the optimized query is performing better than the existing one.

Aspects discussed herein may be performed in real-time or near real-time in order to efficiently evaluate and optimize queries, modify or reorganize data, and the like.

Accordingly, as discussed herein, aspects described may enable dynamic evaluation of queries to determine whether they are optimized, dynamic reorganization of data and/or generation of an optimized query that may be stored for future use. The arrangements described enable faster processing of data and quicker response times for requesting users. For instance, by enabling duplicate copies of data generated by splitting data vertically (e.g., hiding or eliminating some columns not likely to be used by the requesting user) and/or horizontally (hiding or eliminating some rows not likely to be used by the requesting user, such as when a particular time period of data (e.g., "month-end") is requested), and storing the modified data tables (e.g., duplicate copies) in a cache, data may be retrieved quickly and efficiently. Further, using machine learning enables consideration of business considerations, user particular needs, and the like, when modified/reorganizing the data to provide customized data outputs for the user.

Figure 4:
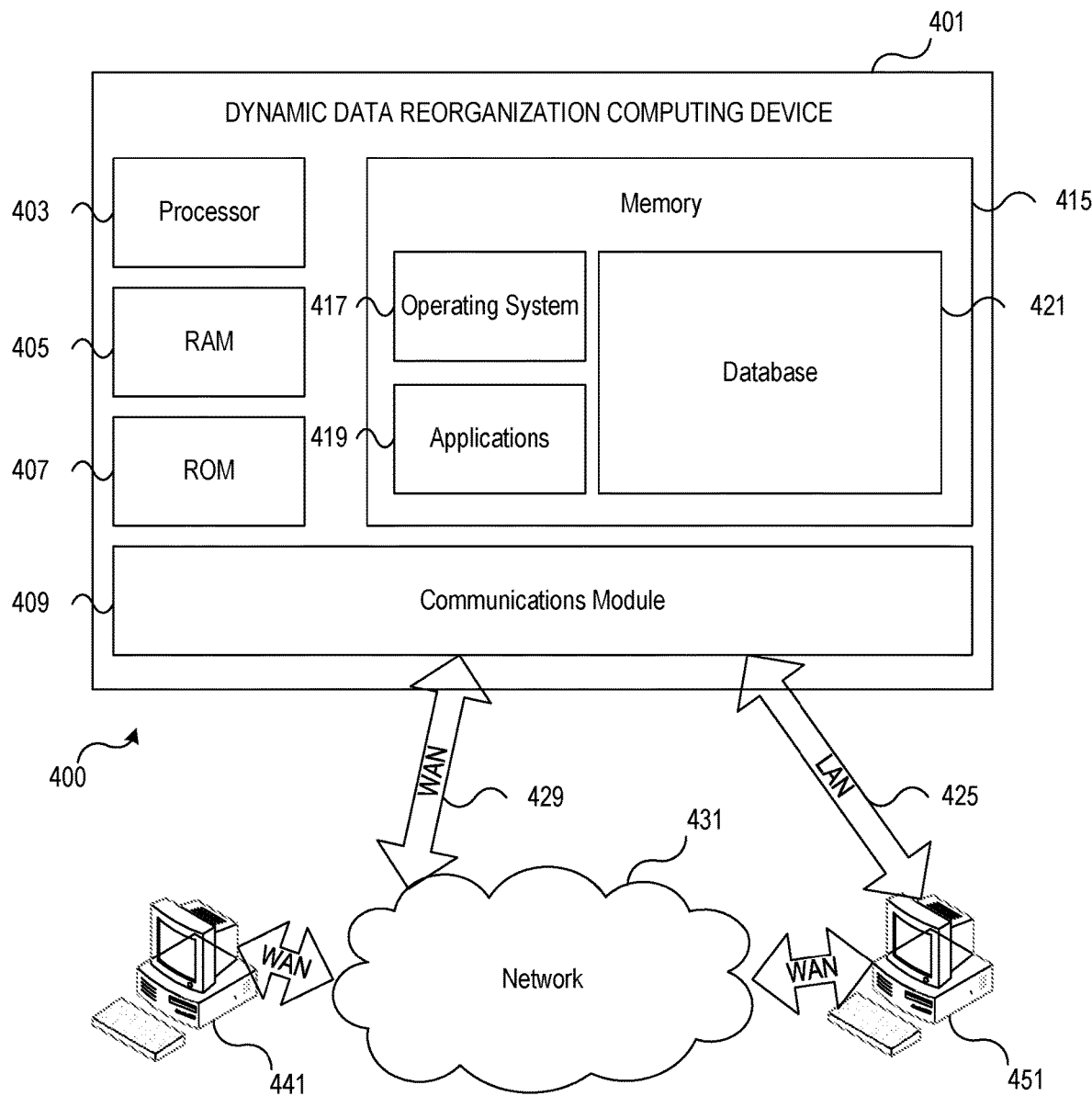
FIG. 4 illustrates one example environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include dynamic data reorganization computing device 401 having processor 403 for controlling overall operation of dynamic data reorganization computing device 401 and its associated components, including Random Access Memory (RAM) 405, Read-Only Memory (ROM) 407, communications module 409, and memory 415. Dynamic data reorganization computing device 401 may include a variety of computer readable media. Computer readable media may be any available media that may be accessed by dynamic data reorganization computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by dynamic data reorganization computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic data reorganization computing device

401. Such a processor may execute computer-executable instructions stored on a computer-readable medium.

Software may be stored within memory 415 and/or storage to provide instructions to processor 403 for enabling dynamic data reorganization computing device 401 to perform various functions as discussed herein. For example, memory 415 may store software used by dynamic data reorganization computing device 401, such as operating system 417, application programs 419, and associated database 421. Also, some or all of the computer executable instructions for dynamic data reorganization computing device 401 may be embodied in hardware or firmware. Although not shown, RAM 405 may include one or more applications representing the application data stored in RAM 405 while dynamic data reorganization computing device 401 is on and corresponding software applications (e.g., software tasks) are running on dynamic data reorganization computing device 401.

Communications module 409 may include a microphone, keypad, touch screen, and/or stylus through which a user of dynamic data reorganization computing device 401 may provide input, and may also include one or more of a speaker for providing audio output and a video display device for providing textual, audiovisual and/or graphical output. Computing system environment 400 may also include optical scanners (not shown).

Dynamic data reorganization computing device 401 may operate in a networked environment supporting connections to one or more remote computing devices, such as computing devices 441 and 451. Computing devices 441 and 451 may be personal computing devices or servers that include any or all of the elements described above relative to dynamic data reorganization computing device 401.

The network connections depicted in FIG. 4 may include Local Area Network (LAN) 425 and Wide Area Network (WAN) 429, as well as other networks. When used in a LAN networking environment, dynamic data reorganization computing device 401 may be connected to LAN 425 through a network interface or adapter in communications module 409. When used in a WAN networking environment, dynamic data reorganization computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 5:
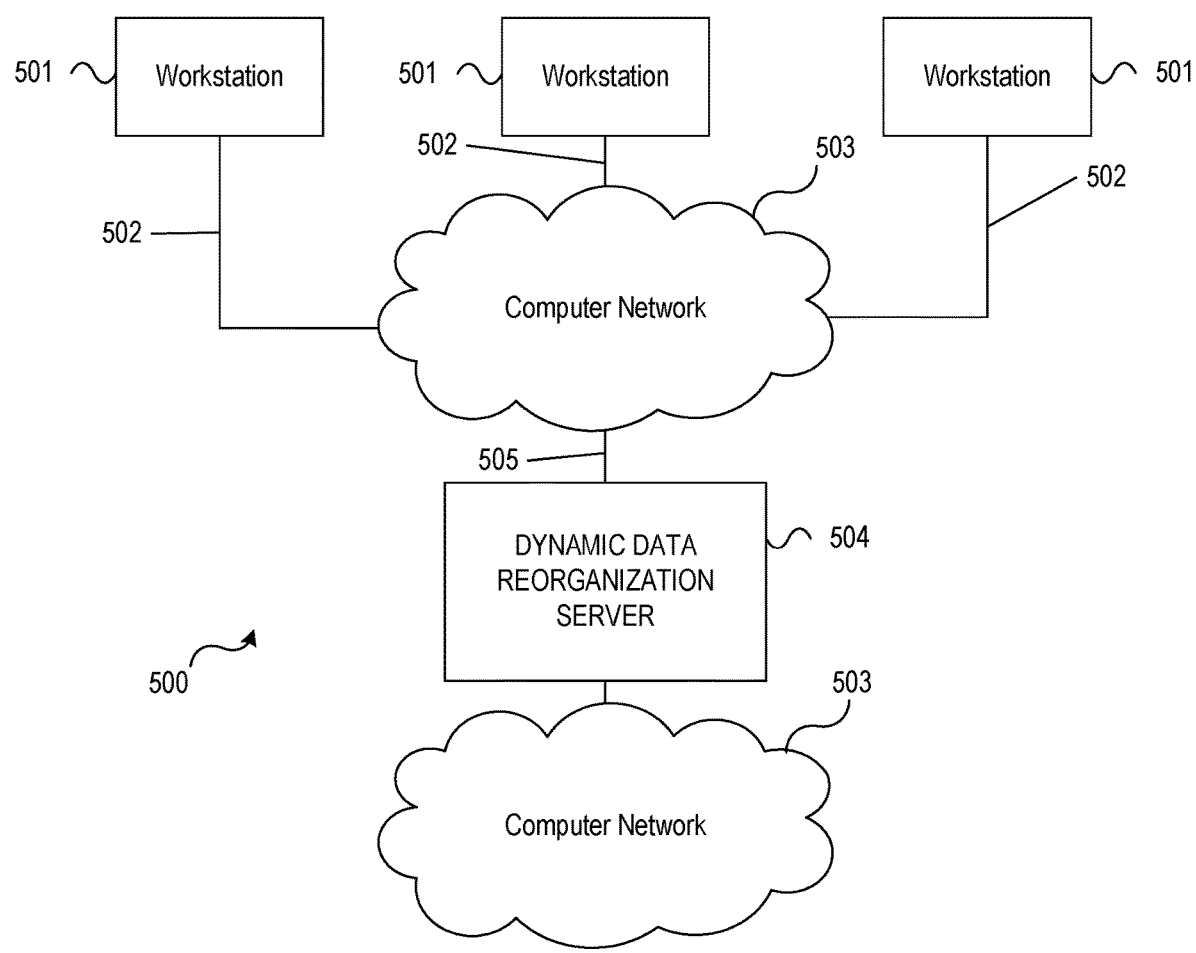
FIG. 5 depicts an illustrative block diagram of workstations and servers that may be used to implement the processes and functions of certain aspects of the present disclosure in accordance with one or more aspects described herein.

FIG. 5 depicts an illustrative block diagram of workstations and servers that may be used to implement the processes and functions of certain aspects of the present disclosure in accordance with one or more example embodiments. Referring to FIG. 5, illustrative system 500 may be used for implementing example embodiments according to the present disclosure. As illustrated, system 500 may include one or more workstation computers 501. Workstation 501 may be, for example, a desktop computer, a smartphone, a wireless device, a tablet computer, a laptop computer, and the like, configured to perform various processes described herein. Workstations 501 may be local or remote, and may be connected by one of communications links 502 to computer network 503 that is linked via communications link 505 to dynamic data reorganization server 504. In system 500, dynamic data reorganization server 504 may be a server, processor, computer, or data processing device, or combination of the same, configured to perform the functions and/or processes described herein. Server 504 may be used to receive queries, evaluate queries, organization and/or modify data, generate new queries, and the like.

Computer network 503 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 502 and 505 may be communications links suitable for communicating between workstations 501 and dynamic data reorganization server 504, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
      receive, from a user device, a database query;
      analyze the database query to determine whether it meets first criteria, wherein determining whether the database query meets first criteria includes determining whether the database query matches a pre-stored optimized query having data that was previously modified using one or more data reorganization processes and is stored in an optimized query cache;
      responsive to determining that the database query meets the first criteria:
         execute the database query; and
         transmit an output of the executed database query to the user device;
      responsive to determining that the database query does not meet the first criteria:
         retrieve data associated with the database query;
         execute, based on one or more machine learning datasets, the one or more data reorganization processes on the data associated with the database query to output modified data, wherein executing, based on the one or more machine learning datasets, the one or more data reorganization processes on the data associated with the database query to output modified data includes using a job function of a user of the user device and the one or more machine learning datasets to generate one or more modified data tables including a number of columns identified using machine learning and a number of rows identified using machine learning, wherein the number of columns identified using machine learning and the number of rows identified using machine learning are fewer than a number of columns and a number of rows in the data associated with the database query;
         generate, based on the modified data, an updated query;
         store, in the optimized query cache, the updated query and the modified data;
         execute the updated query; and
         transmit an output of the executed updated query to the user device.

2. The computing platform of claim 1, wherein the one or more data reorganization processes including one or more of: normalization, de-normalization, purging, and partitioning.

3. The computing platform of claim 1, wherein the updated query is labeled as associated with the user of the user device.

4. The computing platform of claim 1, wherein the modified data includes one or more physical data tables stored in the optimized query cache.

5. The computing platform of claim 1, wherein the optimized query cache is released based on metadata settings.

6. The computing platform of claim 1, wherein generating an updated query includes generating a plurality of updated queries and ranking the plurality of updated queries to identify an optimized query.

7. The computing platform of claim 1, wherein the modified data is stored in a physical data table that is normalized based on business interest.

8. A method, comprising:
   receiving, by a computing platform, the computing platform having at least one processor and memory, and from a user device, a database query;
   analyzing, by the at least one processor, the database query to determine whether it meets first criteria, wherein determining whether the database query meets first criteria includes determining whether the database query matches a pre-stored optimized query having data that was previously modified using one or more data reorganization processes and is stored in an optimized query cache;
   responsive to determining that the database query meets the first criteria:
      executing, by the at least one processor, the database query; and
      transmitting, by the at least one processor, an output of the executed database query to the user device;
   responsive to determining that the database query does not meet the first criteria:
      retrieving, by the at least one processor, data associated with the database query;
      executing, by the at least one processor and based on one or more machine learning datasets, the one or more data reorganization processes on the data associated with the database query to output modified data, wherein executing, based on the one or more machine learning datasets, the one or more data reorganization processes on the data associated with the database query to output modified data includes using a job function of a user of the user device and the one or more machine learning datasets to generate one or more modified data tables including a number of columns identified using machine learning and a number of rows identified using machine learning, wherein the number of columns identified using machine learning and the number of rows identified using machine learning are fewer than a number of columns and a number of rows in the data associated with the database query;

generating, by the at least one processor and based on the modified data, an updated query;

storing, by the at least one processor and in the optimized query cache, the updated query and the modified data;

executing, by the at least one processor, the updated query; and transmitting, by the at least one processor, an output of the executed updated query to the user device.

9. The method of claim 8, wherein the one or more data reorganization processes including one or more of: normalization, de-normalization, purging, and partitioning.

10. The method of claim 8, wherein the updated query is labeled as associated with the user of the user device.

11. The method of claim 8, wherein the modified data includes one or more physical data tables stored in the optimized query cache.

12. The method of claim 8, wherein the optimized query cache is released based on metadata settings.

13. The method of claim 8, wherein generating an updated query includes generating a plurality of updated queries and ranking the plurality of updated queries to identify an optimized query.

14. One or more non-transitory computer-readable media storing instructions that, when executed by a computing platform comprising at least one processor, memory, and a communication interface, cause the computing platform to:

receive, from a user device, a database query;

analyze the database query to determine whether it meets first criteria, wherein determining whether the database query meets first criteria includes determining whether the database query matches a pre-stored optimized query having data that was previously modified using one or more data reorganization processes and is stored in an optimized query cache;

responsive to determining that the database query meets the first criteria:

execute the database query; and transmit an output of the executed database query to the user device;

responsive to determining that the database query does not meet the first criteria:

retrieve data associated with the database query;

execute, based on one or more machine learning datasets, the one or more data reorganization processes on the data associated with the database query to output modified data, wherein executing, based on the one or more machine learning datasets, the one or more data reorganization processes on the data associated with the database query to output modified data includes using a job function of a user of the user device and the one or more machine learning datasets to generate one or more modified data tables including a number of columns identified using machine learning and a number of rows identified using machine learning, wherein the number of columns identified using machine learning and the number of rows identified using machine learning are fewer than a number of columns and a number of rows in the data associated with the database query;

generate, based on the modified data, an updated query;

store, in the optimized query cache, the updated query and the modified data;

execute the updated query; and transmit an output of the executed updated query to the user device.

15. The one or more non-transitory computer-readable media of claim 14, wherein the one or more data reorganization processes including one or more of: normalization, de-normalization, purging, and partitioning.

16. The one or more non-transitory computer-readable media of claim 14, wherein the updated query is labeled as associated with the user of the user device.

17. The one or more non-transitory computer-readable media of claim 14, wherein the modified data includes one or more physical data tables stored in the optimized query cache.

18. The one or more non-transitory computer-readable media of claim 14, wherein the optimized query cache is released based on metadata settings.

19. The one or more non-transitory computer-readable media of claim 14, wherein generating an updated query includes generating a plurality of updated queries and ranking the plurality of updated queries to identify an optimized query.

* * * * *